US011692645B2

(12) United States Patent
Parish et al.

(10) Patent No.: US 11,692,645 B2
(45) Date of Patent: Jul. 4, 2023

(54) VALVE WITH RE-MELTING EXPANSION PORT

(71) Applicant: Flowserve Management Company, Irving, TX (US)

(72) Inventors: Paul Jeffrey Parish, Spanish Fork, UT (US); Michael P. Nelson, Lehi, UT (US)

(73) Assignee: Flowserve Management Company, Irving, TX (US)

( * ) Notice: Subject to any disclaimer, the term of this patent is extended or adjusted under 35 U.S.C. 154(b) by 38 days.

(21) Appl. No.: 17/485,676

(22) Filed: Sep. 27, 2021

(65) Prior Publication Data

US 2023/0097609 A1 Mar. 30, 2023

(51) Int. Cl.
*F16K 49/00* (2006.01)
*F16K 1/52* (2006.01)

(52) U.S. Cl.
CPC .............. *F16K 49/005* (2013.01); *F16K 1/52* (2013.01)

(58) Field of Classification Search
CPC ...... F16K 49/00; F16K 49/002; F16K 49/005; F16K 49/007; Y10T 137/86815; Y10T 137/87684; Y10T 137/87692
USPC ...................................................... 138/26–31
See application file for complete search history.

(56) References Cited

U.S. PATENT DOCUMENTS

| | | | | |
|---|---|---|---|---|
| 2,209,296 A | * | 7/1940 | Jewell ...................... | C10G 9/00 137/601.01 |
| 2,254,472 A | * | 9/1941 | Dahl ...................... | F16K 49/00 137/240 |
| 3,110,319 A | | 11/1963 | Yoshiaki | |
| 3,120,600 A | * | 2/1964 | True ........................ | F24H 1/142 137/341 |
| 6,883,534 B2 | * | 4/2005 | Ball ...................... | F16K 27/006 137/60 |

(Continued)

FOREIGN PATENT DOCUMENTS

| | | |
|---|---|---|
| JP | 61139376 U | 8/1986 |
| KR | 1020030043643 A | 6/2003 |
| KR | 1020180015878 A | 2/2018 |

OTHER PUBLICATIONS

International Search Report and Written Opinion for PCT Application No. PCT/US2022/043352 dated Jan. 5, 2023, 13 pages.

(Continued)

*Primary Examiner* — Kevin F Murphy
(74) *Attorney, Agent, or Firm* — Maine Cernota & Rardin

(57) ABSTRACT

A valve for controlling a molten liquid includes an expansion port in liquid communication with an internal volume of the valve that is filled with the molten liquid. An expansion valve can be opened during unfreezing of the valve, to allow melting process substance to expand out of the internal volume into an expansion line as it is melted. During initialization of the valve, an inert gas source, pressure regulator, and ultrasonic transition level sensor can be used to establish a liquid/gas interface at a desired height within the expansion line. The valve can include a multi-zone heater, wherein a first of the zones is adjacent the expansion port, so that during unfreezing, after the first zone has been melted, the remaining zones can be sequentially activated in an order that ensures that each zone is activated only after an adjacent zone has been melted.

19 Claims, 6 Drawing Sheets

(56) References Cited

U.S. PATENT DOCUMENTS

| | | | |
|---|---|---|---|
| 8,950,425 B1* | 2/2015 | Jansen | F16K 11/07 137/340 |
| 2015/0240968 A1 | 8/2015 | Coleman | |
| 2019/0226937 A1 | 7/2019 | Glime, III | |
| 2020/0300384 A1 | 9/2020 | Iijima | |

OTHER PUBLICATIONS

International Search Report and Written Opinion for PCT Application No. PCT/US2022/043341 dated Jan. 10, 2023, 10 pages.

* cited by examiner

VALVE WITH RE-MELTING EXPANSION PORT

STATEMENT OF GOVERNMENT INTEREST

Portions of the present invention may have been made in conjunction with Government funding under contract number DE-NA0003525, and there may be certain rights to the Government.

FIELD OF THE INVENTION

The invention relates to valves, and more particularly, to valves that are used to control a flow of a molten liquid that is a solid at ambient temperature.

BACKGROUND OF THE INVENTION

Some process valves are required to control a flow of a hot, molten process liquid that is a solid at room temperature. In many cases, when the molten process liquid cools and solidifies, its volume decreases, and when the process substance is re-melted, its volume once again expands. Molten chloride salt is an example of such a material, and is becoming of increasing importance to processes in several industries, including the concentrated solar power (CSP) industry and the thorium-based nuclear power industry.

When a molten process liquid cools and solidifies, i.e. "freezes," within a valve, for example during an upset condition, freeze recovery can be difficult if the process substance expands when it melts, because when the valve is heated, the re-melting process substance may not find space within the valve for the needed expansion, especially if the material remains solid at the inlet and outlet of the valve as it melts within the valve. As a result, the valve can be structurally damaged by the expanding, re-melting liquid, resulting in an inoperable valve. This danger is exacerbated if the valve design includes a substantial internal volume that is normally filled with the molten process liquid.

For critical valve applications where even the smallest amount of external valve leakage is not acceptable, a bellows seal valve is typically used. In the cases of molten process liquids, the unfreezing process can be especially hazardous to a bellows valve, due to the large internal volume that tends to be filled with process liquid (on either the inside or outside of the bellows) and due to the innate fragility of the bellows.

With reference to the sectional diagram of FIG. 1, a bellows seal valve comprises an accordion-like bellows 100. One end 102 of the bellows 100 is welded or otherwise attached to the valve stem 104. The other end 106 of the bellows 100 is welded to a part 108 that is clamped or otherwise attached to the valve bonnet 109. When operating the valve, the valve stem 104 is moved in a linear valve stroke so as to control the position of a valve plug 110 relative to a valve seat 112. During the valve stroke, the bellows 100 compresses or expands along with the linear motion of the sliding valve stem 104.

Since the bellows 100 has a static seal at each end 102, 106, and the circumference of the valve stem 104 is covered by the bellows 100, a metal barrier between the process liquid inside of the valve and the external atmosphere is provided, eliminating leakage at the valve stem 104. In the example of FIG. 1, the process liquid is outside of the bellows 100, and the atmosphere is inside of the bellows 100. For other bellows valves, the process liquid is inside of the bellows 100 and the atmosphere is outside of the bellows 100. The bellows valve (or other molten liquid valve) may further include a heater 116 that is controlled by a heat controller 118, that can be used to unfreeze the valve if needed.

It is intrinsic to the design of a bellows valve that there is a substantial internal volume that is normally filled by the process liquid. In particular, the process liquid is generally in contact with either the inner or outer surface of the bellows 100 along its entire length. Because the metal bellows 100 is flexed as the valve stem 104 is moved, it is necessarily somewhat fragile, and can easily be damaged by an expanding, unfreezing process substance.

What is needed, therefore, is a valve design that is configured to accommodate the expansion of a normally molten process liquid when it is re-melted after freezing within the valve.

SUMMARY OF THE INVENTION

The present invention comprises a valve design that is configured to accommodate the expansion of a normally molten process liquid when it is re-melted after freezing within the valve. In embodiments, the valve is a bellows valve. Embodiments of the present invention further include an expansion control system and a method of safely unfreezing the disclosed valve.

According to the present invention, the valve design includes a process liquid expansion port that enables liquid communication between an expansion line and an internal process liquid volume of the valve that is normally filled with process liquid. During normal operation of the valve, the process liquid is prevented from flowing out through the expansion port by the closing of an expansion valve provided in the expansion line. During unfreezing of the process substance, for example when recovering from an upset condition, the expansion valve is temporarily opened, so that an expansion path is provided to the melting process substance.

In embodiments, the expansion control system further includes a source of an inert gas, such as nitrogen gas, and a pressure regulator that is able to control the pressure of the inert gas in the expansion line. According to the disclosed method, when the valve is first put into service, and the molten process liquid begins to flow into the expansion line, the inert gas is used to pressurize the expansion line, so that the process liquid is prevented from reaching the expansion valve.

In some of these embodiments, regulation of the inert gas pressure continues during operation of the valve. In other embodiments, once an appropriate inert gas pressure is established within the expansion line, the expansion valve is closed, so that a fixed quantity of the inert gas remains in contact with the process liquid and a liquid/gas boundary is established within the expansion line. If the process liquid expands or contracts during normal operation, for example due to temperature fluctuations of the process liquid, this is accommodated by a shifting of the liquid/gas boundary within the expansion line.

Embodiments further include a liquid gas transition sensor, such as an ultrasonic sensor, that is able to detect the level of the liquid/gas boundary within the expansion line, and the pressure of the inert gas is regulated to adjust the liquid/gas boundary to be at a desired location within the expansion line.

In embodiments, the valve further includes a heater that is configured to heat the valve, thereby maintaining the process substance within the valve as a liquid during normal operation, if needed, and to re-melt the process substance if it becomes necessary to unfreeze the valve. In some of these embodiments, the heater is divided into separately controlled heating zones that are configured to heat corresponding portions of the internal process liquid volume of the valve. According to method embodiments of the present invention, a heating zone that extends to the expansion port is heated first, and then after the process substance that is proximal to the expansion port has been melted, adjacent zones are heated sequentially so that, in each instance, the process substance is able to expand as it melts into an adjacent, already-melted zone. As a result, damage and undue stress to the valve during re-melting of the process substance within the valve is avoided.

Much of the following discussion is directed to exemplary embodiments where the valve is a bellows valve, and where the process liquid within the valve is in contact with the external side of the bellows. However, one of skill in the art will be easily able to adapt the principles of the present invention to virtually any type of process valve that controls a molten process liquid, including a bellows valve in which the process liquid occupies the interior of the bellows, and also including valves that are not bellows valves.

A first general aspect of the present invention is a valve system configured for controlling a flow of a molten process liquid. The valve system includes a valve having an internal process liquid volume that is normally filled with the process liquid during operation of the valve, an expansion port provided in the valve, the expansion port being in liquid communication with the internal process liquid volume, an expansion line in fluid communication with the expansion port, and an expansion valve that is operable to permit or block a fluid flow through the expansion line.

Embodiments further include an expansion volume into which process liquid can flow from the expansion line when the expansion valve is open.

Any of the above embodiments can further include a pressurized inert gas source in gas communication with the expansion line. Some of these embodiments further include a pressure regulator configured to regulate a pressure of the inert gas within the expansion line. In some of these embodiments the expansion line includes a liquid/gas transition sensor that is able to detect a liquid/gas interface level within an interface zone of the expansion line. In some of these embodiments, the liquid/gas transition sensor is an ultrasonic sensor. And any of these embodiments can further include a gas controller that is configured to control the pressure regulator so as to regulate a height of the liquid gas interface level within the interface zone according to interface data provided to the gas controller by the liquid/gas transition sensor.

Any of the above embodiments can further include a pressure sensor included in the expansion line and configured to measure a pressure of the inert gas within the expansion line.

Any of the above embodiments can further include a temperature sensor included in the expansion line and configured to measure a temperature of the inert gas in the expansion line.

Any of the above embodiments can further include a gas heater configured to heat the inert gas within the expansion line.

Any of the above embodiments can further include a gas vent configured to vent the inert gas from the expansion line.

Any of the above embodiments can further include comprising a valve heater controlled by a heat controller. In some of these embodiments, the heater is divided into a plurality of heating zones that can be separately controlled by the heat controller, a first one of the heating zones being proximate the expansion port.

A second general aspect of the present invention is a method of initializing a flow of a molten process liquid through a valve. The method includes:

A) providing a valve system according to the first general aspect;

B) opening the expansion valve;

C) filling the internal process liquid volume with the pressurized inert gas;

D) introducing the molten process liquid into the valve; and

E) controlling the pressure regulator so as to cause the molten process liquid to fill the internal process liquid volume, displacing the inert gas therein, and to enter into the expansion line, so that a liquid/gas interface is formed between the molten process liquid and the inert gas within the expansion line.

In embodiments, the valve system further comprises a gas heater, and the method further comprises heating the inert gas before performing step B).

Any of the above embodiments can further include, after step E), closing the expansion valve.

In any of the above embodiments the valve system can further include a liquid/gas transition sensor, and wherein step E) includes using the liquid/gas transition sensor to monitor a height of the liquid/gas interface within the expansion line. In some of these embodiments, the method further comprises, after step E), controlling the pressure regulator so as to maintain the liquid/gas interface within a specified height range within the expansion line.

A third general aspect of the present invention is a method of unfreezing a valve that is configured for controlling a flow of a molten process liquid, after the process liquid has cooled and solidified into a solid process substance within the valve. The method includes:

A) providing a valve according to the second general aspect;

B) opening the expansion valve;

C) activating the first heater zone until substantially all process substance within the first heater zone has been melted;

D) activating a next of the heater zones that is adjacent to the first heater zone until substantially all process substance within the next heater zone has been melted;

E) if the plurality of heating zones includes more than two heating zones, repeating step D) until all of the process substance within the valve has been melted, wherein each of the heating zones is activated only after the process substance in an adjacent heating zone has been melted; and F) reestablishing the flow of the molten process liquid through the valve.

In embodiments, the valve system further includes a gas heater, and the method further includes, before performing step B), heating the inert gas and introducing the heated inert gas into the expansion line until any process substance within the expansion line has been melted.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION

The present invention comprises a valve design that is configured to accommodate the expansion of a normally molten process liquid when it is re-melted after freezing within the valve. In embodiments, the valve is a bellows valve. Embodiments of the present invention further include an expansion control system and a method of safely unfreezing the disclosed valve.

Figure 1:
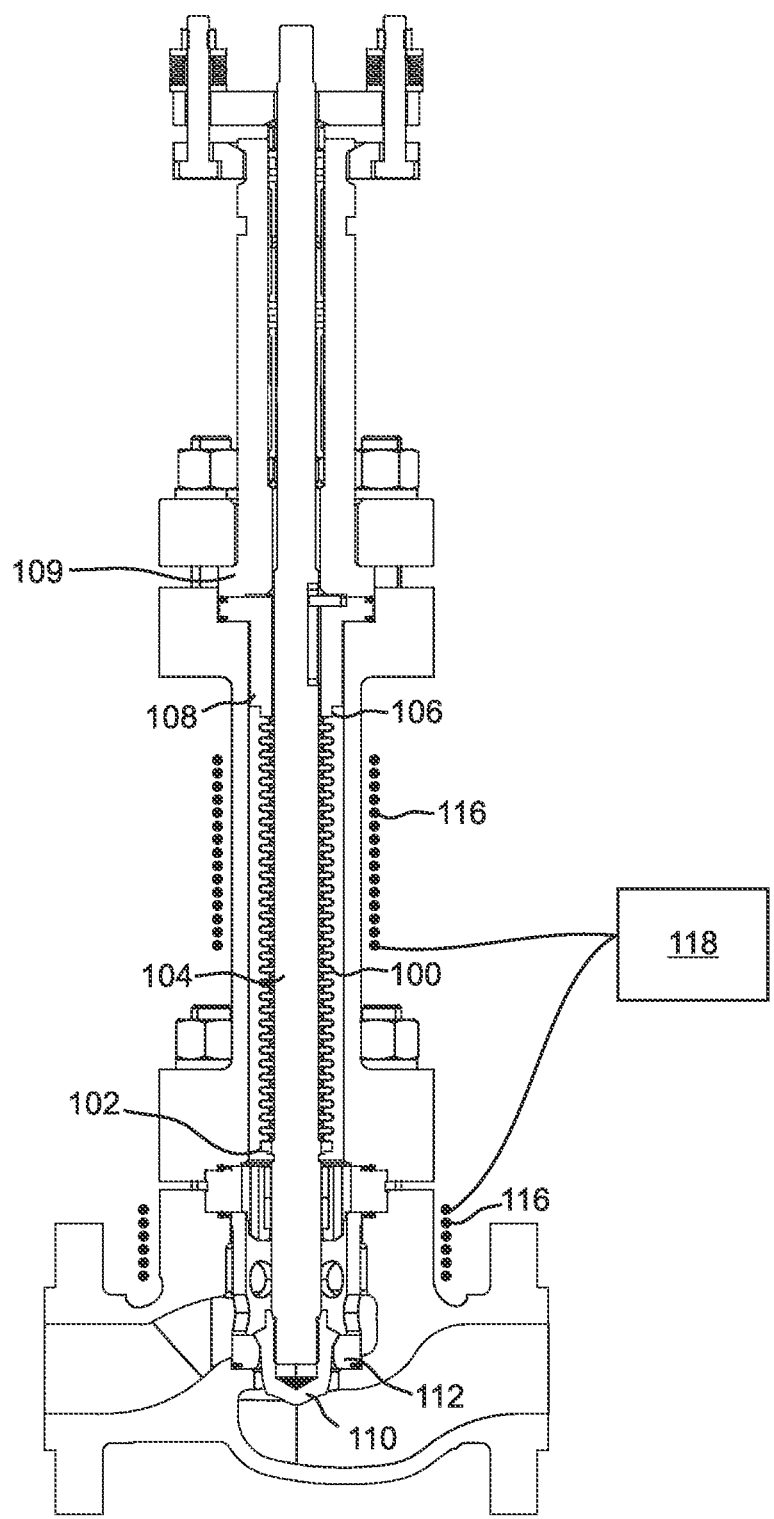
FIG. 1 is a sectional view drawn to scale of a bellows valve of the prior art.
Figure 2:
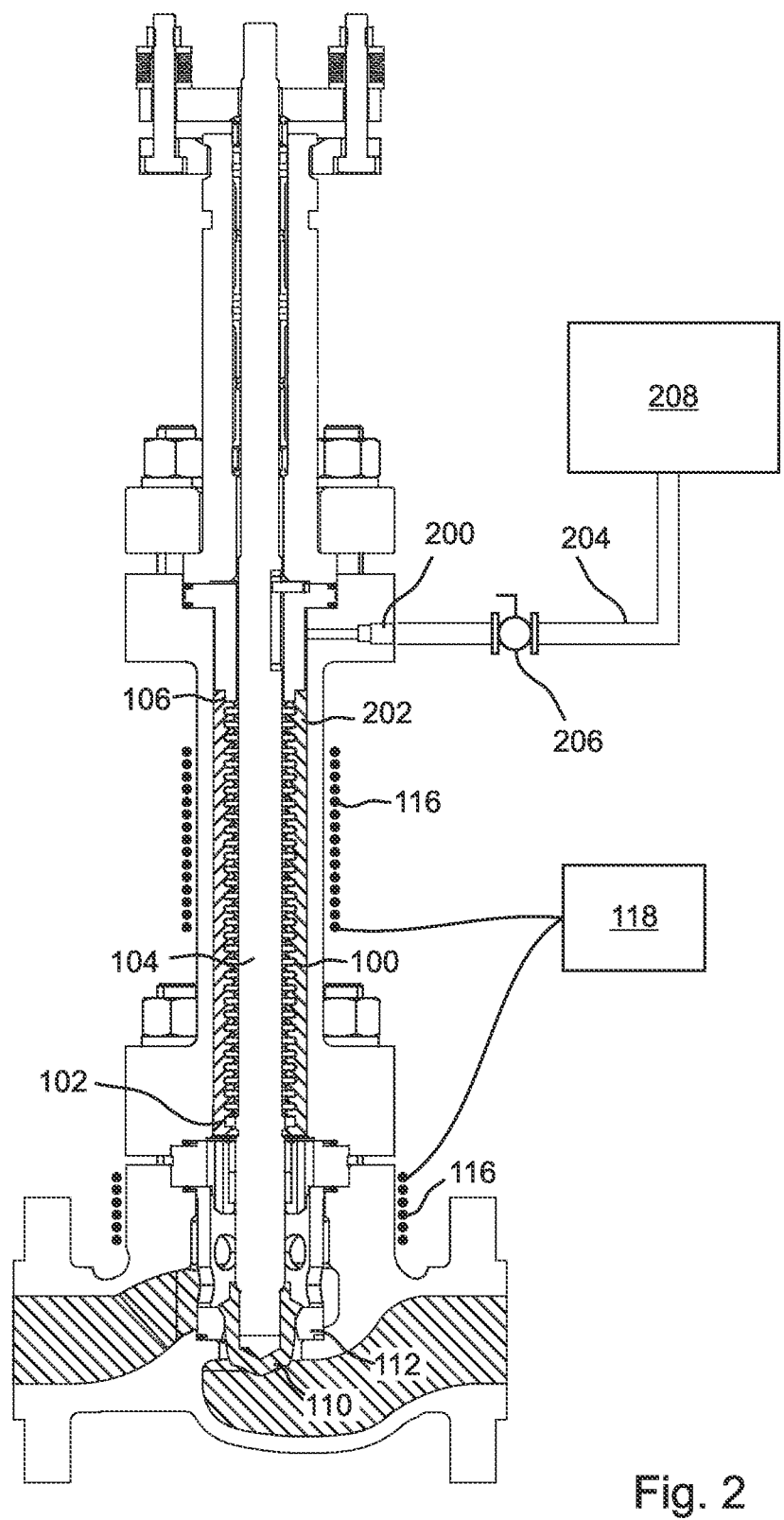
FIG. 2 is a sectional view drawn to scale of an embodiment of the present invention.

With reference to FIG. 2, according to the present invention the valve design includes a process liquid expansion port 200 that enables liquid communication between an expansion line 204 and an internal process liquid volume 202 of the valve that is normally filled with process liquid. During normal operation of the valve, the process liquid is prevented from flowing out through the expansion port 200 by the closing of an expansion valve 206. During unfreezing of the process substance, for example when recovering from an upset condition, the expansion valve 206 is temporarily opened, so that an expansion volume is provided to the melting process substance. In the embodiment of FIG. 2, the expansion valve 206 is able to tolerate contact with the molten process liquid, and to convey the newly-melted process liquid to an expansion volume 208.

Figure 3:
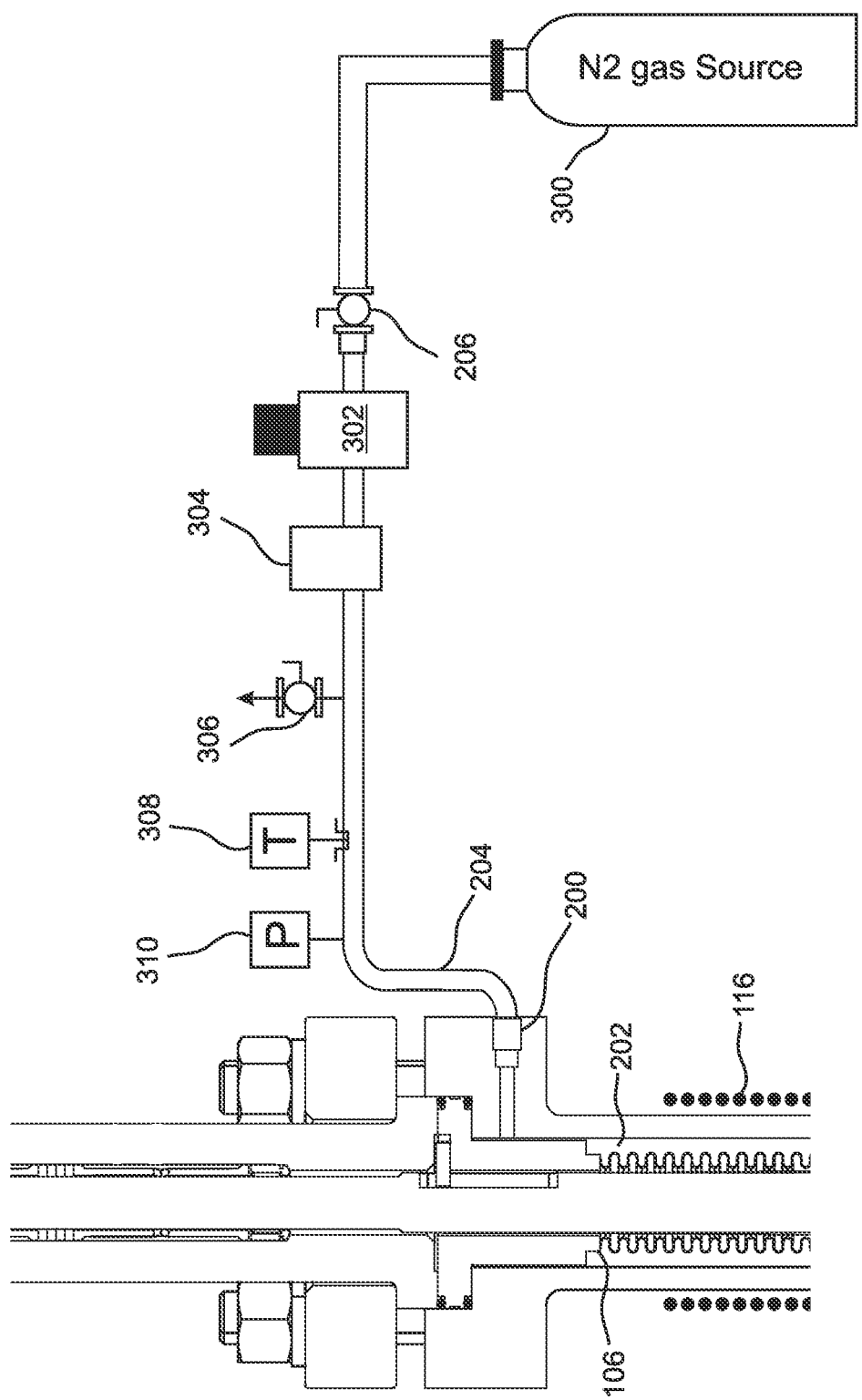
FIG. 3 is close-up sectional view of a portion of the valve of FIG. 2, shown connected to an expansion control system, the valve being drawn to scale.

With reference to FIG. 3, in embodiments the expansion control system further includes a source of 300 an inert gas, such as nitrogen gas, and a pressure regulator 302 that is able to control the pressure of the inert gas in the expansion line 204. In the embodiment of FIG. 3, the expansion line 204 further includes a gas heater 304 and a gas vent 306, as well as temperature 308 and pressure 310 sensors.

Figure 4:
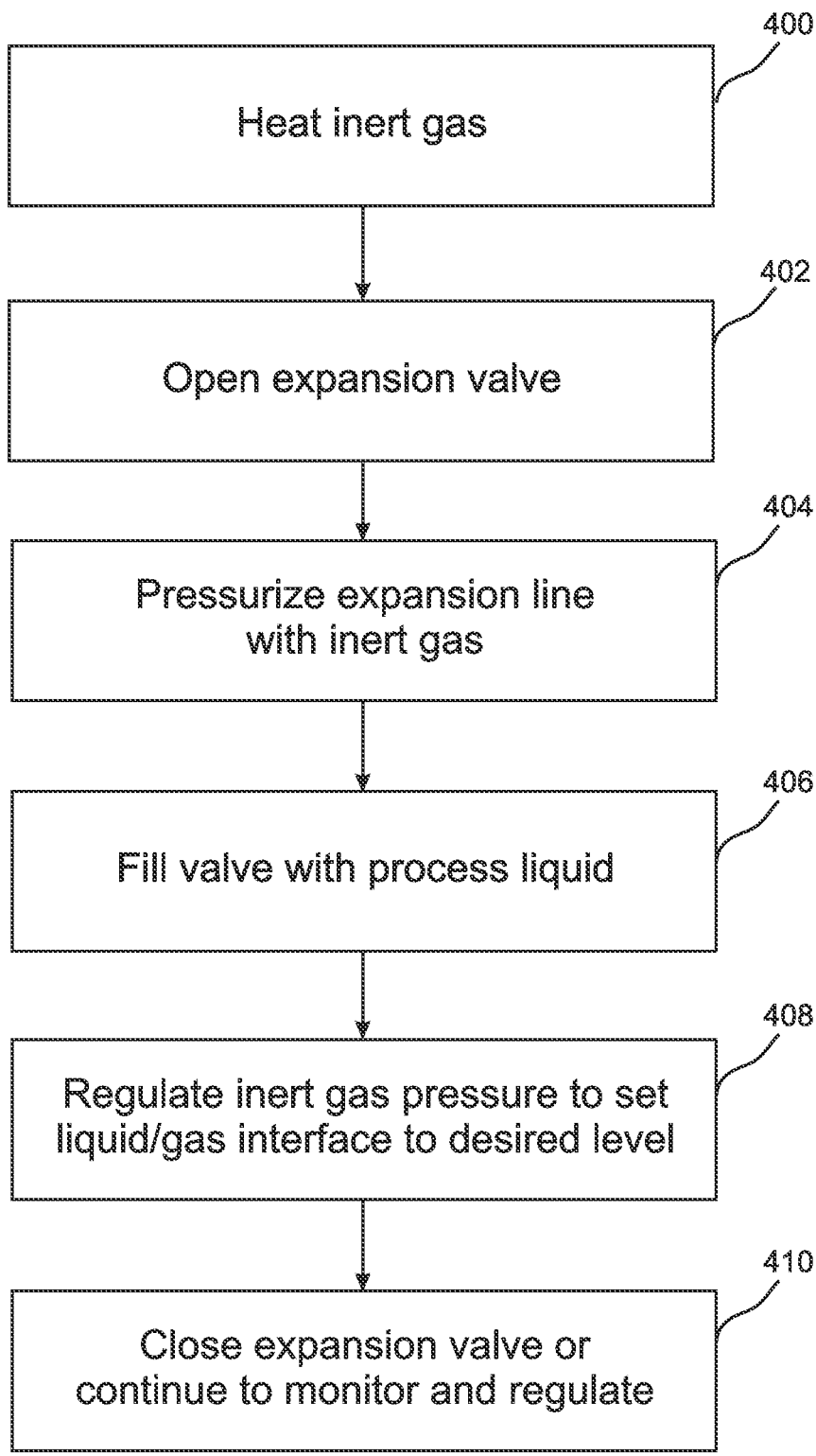
FIG. 4 is a flow diagram illustrating a method for implementing the disclosed valve in an embodiment of the present invention.

With reference to FIG. 4, in method embodiments of the present invention, before the molten process liquid is introduced into the valve, the inert gas is heated 400 and the expansion valve is opened 402, so that the expansion line 204 and the process liquid volume 202 with in the interior of the valve are pressurized 404 with the heated, inert gas. The molten process liquid is then introduced into the valve 406, while the pressure of the inert gas is regulated such that the process liquid fills the process liquid volume 202 within the valve and enters into the expansion line 204, where it forms a liquid/gas interface (500, in FIG. 5) within the expansion line 204. Embodiments further include a liquid/gas transition sensor (502 in FIG. 5), such as an ultrasonic sensor, that is able to detect the level of the liquid/gas boundary 500 within the expansion line 204. In some of these embodiments, the pressure of the inert gas is regulated 408 to adjust the liquid/gas boundary 500 to be at a desired level 500 within the expansion line 204.

In some of these embodiments, regulation 408 of the inert gas pressure continues 410 during operation of the valve. In other embodiments, once an appropriate inert gas pressure is established within the expansion line 204, the expansion valve 206 is closed 410, so that a fixed quantity of the inert gas remains in contact with the process liquid. If the process liquid expands or contracts during normal operation, for example due to temperature fluctuations of the process liquid, this is accommodated by a shifting of the liquid/gas boundary 500 within the expansion line 204.

Figure 5:
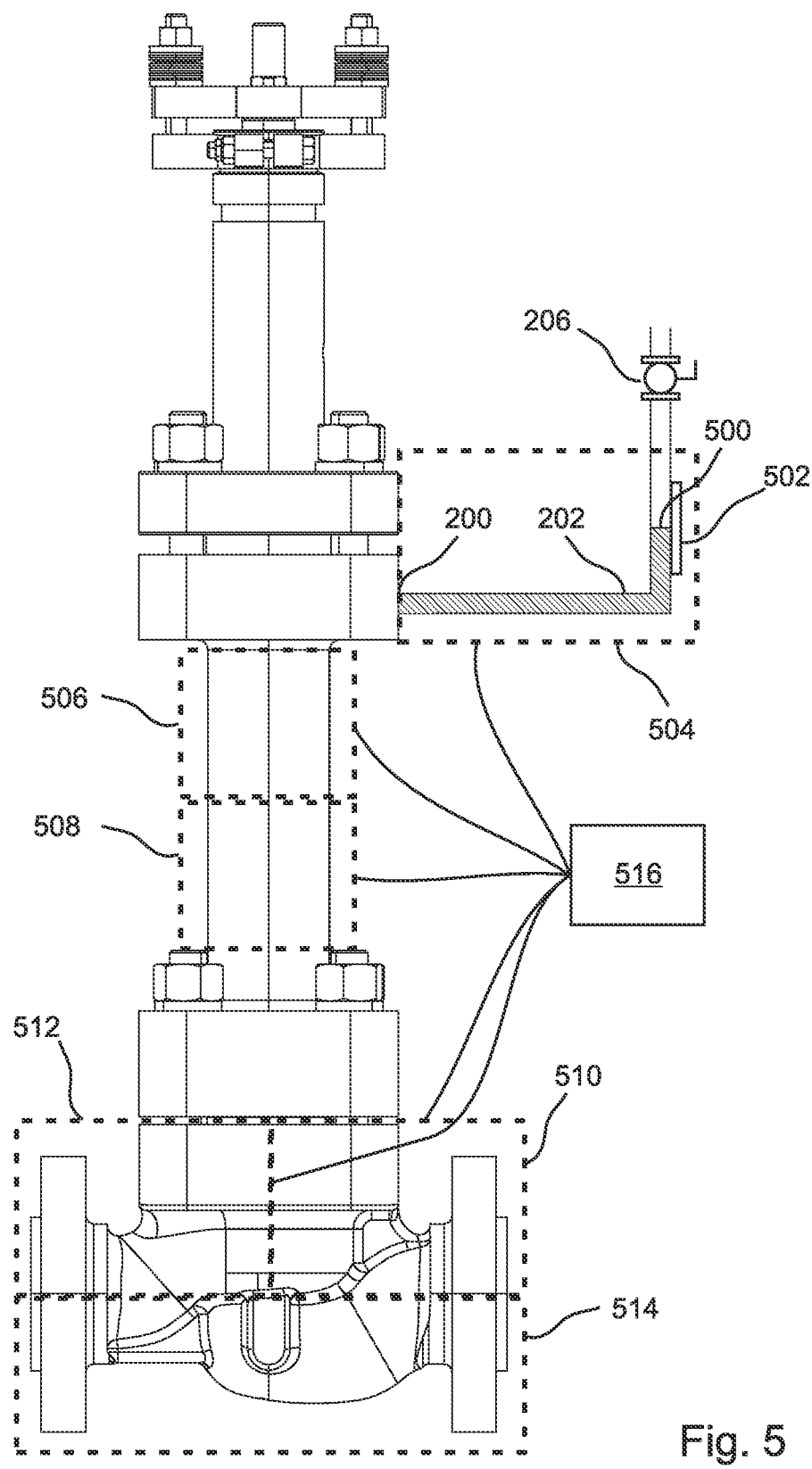
FIG. 5 is a sectional view of a valve in an embodiment of the present invention where the valve includes a plurality of independently controlled heating zones.

With reference to FIG. 5, in some embodiments, the heater 116 is divided into a plurality of heating zones 504-514 that are configured to heat corresponding portions of the internal process liquid volume 202 of the valve. The heating zones 504-514 are separately controlled by the heat controller 516.

Figure 6:
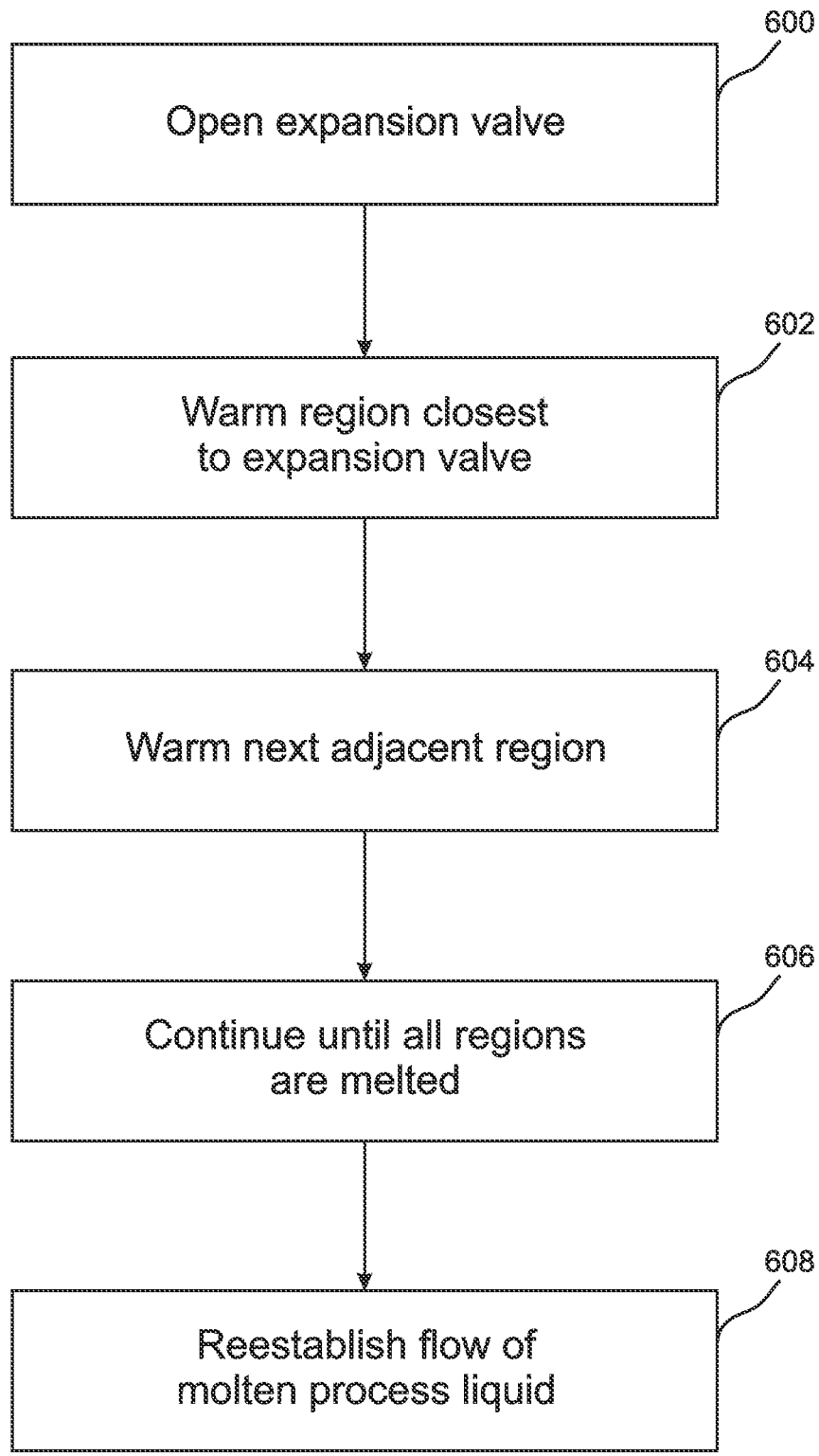
FIG. 6 is a flow diagram illustrating a method of unfreezing the valve of FIG. 5 in an embodiment of the present invention, the valve being drawn to scale.

With reference to FIG. 6, according to some method embodiments of the present invention, the process of unfreezing the valve begins with opening 600 of the expansion valve 206 and heating 602 the first heating zone 504, which is adjacent to the expansion port 200. In embodiments, before heating 602 the first heating zone 504, the gas heater 304 is used to heat inert gas, and then the heated inert gas is used to melt any process liquid that may have been frozen within the expansion line 204.

Once the process substance has been melted 602 within the first heating zone 504, the second heating zone 506, which is adjacent to the first heating zone, is heated 604 until the process substance within the second heating zone 506 has been melted. This process is continued 606, whereby adjacent heating zones are heated sequentially such that, in each instance, the process substance that is being melted is able to expand into an adjacent, already-melted heating zone. As a result, damage and undue stress to the valve during re-melting of the process substance within the valve is avoided. Finally, a flow of the molten process liquid is reestablished 608 within the valve.

Many of the drawings and the corresponding descriptions presented herein refer to exemplary embodiments in which the valve is a bellows valve, and wherein the process liquid within the valve is in contact with the external side of the bellows. However, one of skill in the art will immediately realize that the scope of the present invention is not limited to these exemplary cases, but rather extends to virtually any type of process valve that controls a molten process liquid, including a bellows valve in which the process liquid occupies the interior of the bellows, and also including valves that are not bellows valves.

The foregoing description of the embodiments of the invention has been presented for the purposes of illustration and description. Each and every page of this submission, and all contents thereon, however characterized, identified, or numbered, is considered a substantive part of this application for all purposes, irrespective of form or placement within the application. This specification is not intended to be exhaustive or to limit the invention to the precise form disclosed. Many modifications and variations are possible in light of this disclosure.

Although the present application is shown in a limited number of forms, the scope of the invention is not limited to just these forms, but is amenable to various changes and modifications. The disclosure presented herein does not explicitly disclose all possible combinations of features that fall within the scope of the invention. The features disclosed herein for the various embodiments can generally be interchanged and combined into any combinations that are not self-contradictory without departing from the scope of the invention. In particular, the limitations presented in dependent claims below can be combined with their corresponding independent claims in any number and in any order without departing from the scope of this disclosure, unless the dependent claims are logically incompatible with each other.

We claim:

1. A valve system configured for controlling a flow of a molten process liquid, the valve system comprising:
   a valve having an internal process liquid volume that is normally filled with the process liquid during operation of the valve;
   an expansion port provided in the valve, the expansion port being in liquid communication with the internal process liquid volume;
   an expansion line in fluid communication with the expansion port;
   an expansion valve that is operable to permit or block a fluid flow through the expansion line; and
   a pressurized inert gas source in gas communication with the expansion line.

2. The valve system of claim 1, further comprising an expansion volume into which process liquid can flow from the expansion line when the expansion valve is open.

3. The valve system of claim 2, further comprising a pressure regulator configured to regulate a pressure of the inert gas within the expansion line.

4. The valve system of claim 3, wherein the expansion line includes a liquid/gas transition sensor that is able to detect a liquid/gas interface level within an interface zone of the expansion line.

5. The valve system of claim 4, wherein the liquid/gas transition sensor is an ultrasonic sensor.

6. The valve system of claim 4, further comprising a gas controller that is configured to control the pressure regulator so as to regulate a height of the liquid gas interface level within the interface zone according to interface data provided to the gas controller by the liquid/gas transition sensor.

7. The valve system of claim 2, further comprising a pressure sensor included in the expansion line and configured to measure a pressure of the inert gas within the expansion line.

8. The valve system of claim 2, further comprising a temperature sensor included in the expansion line and configured to measure a temperature of the inert gas in the expansion line.

9. The valve system of claim 2, further comprising a gas heater configured to heat the inert gas within the expansion line.

10. The valve system of claim 2, further comprising a gas vent configured to vent the inert gas from the expansion line.

11. The valve system of claim 1, further comprising a valve heater controlled by a heat controller.

12. The valve system of claim 11, wherein the heater is divided into a plurality of heating zones that can be separately controlled by the heat controller, a first one of the heating zones being proximate the expansion port.

13. A method of initializing a flow of a molten process liquid through a valve, the method comprising:
   A) providing a valve system according to claim 3;
   B) opening the expansion valve;
   C) filling the internal process liquid volume with the pressurized inert gas;
   D) introducing the molten process liquid into the valve; and
   E) controlling the pressure regulator so as to cause the molten process liquid to fill the internal process liquid volume, displacing the inert gas therein, and to enter into the expansion line, so that a liquid/gas interface is formed between the molten process liquid and the inert gas within the expansion line.

14. The method of claim 13, wherein the valve system further comprises a gas heater, and wherein the method further comprises heating the inert gas before performing step B).

15. The method of claim 13, further comprising, after step E), closing the expansion valve.

16. The method of claim 13, wherein the valve system further comprises a liquid/gas transition sensor, and wherein step E) includes using the liquid/gas transition sensor to monitor a height of the liquid/gas interface within the expansion line.

17. The method of claim 16, wherein the method further comprises, after step E), controlling the pressure regulator so as to maintain the liquid/gas interface within a specified height range within the expansion line.

18. A method of unfreezing a valve that is configured for controlling a flow of a molten process liquid, after the process liquid has cooled and solidified into a solid process substance within the valve, the method comprising:
   A) providing a valve according to claim 12;
   B) opening the expansion valve;
   C) activating the first heater zone until substantially all process substance within the first heater zone has been melted;
   D) activating a next of the heater zones that is adjacent to the first heater zone until substantially all process substance within the next heater zone has been melted;
   E) if the plurality of heating zones includes more than two heating zones, repeating step D) until all of the process substance within the valve has been melted, wherein each of the heating zones is activated only after the process substance in an adjacent heating zone has been melted; and
   F) reestablishing the flow of the molten process liquid through the valve.

19. The method of claim 18, wherein the valve system further comprises a gas heater, and wherein the method further comprises, before performing step B), heating an inert gas and introducing the heated inert gas into the expansion line until any process substance within the expansion line has been melted.

* * * * *